US006561201B1

(12) United States Patent
Midkiff

(10) Patent No.: US 6,561,201 B1
(45) Date of Patent: May 13, 2003

(54) VEHICLE TIRE AND WHEEL WASHING APPARATUS

(76) Inventor: David G. Midkiff, 3723 Prosperity Ave., Fairfax, VA (US) 22031

(*) Notice: Subject to any disclaimer, the term of this patent is extended or adjusted under 35 U.S.C. 154(b) by 7 days.

(21) Appl. No.: 09/834,862

(22) Filed: Apr. 16, 2001

(51) Int. Cl.[7] .................................................. B08B 3/02
(52) U.S. Cl. ..................... 134/104.4; 134/123; 134/135
(58) Field of Search .......................... 134/104.1, 104.4, 134/123, 135

(56) References Cited

U.S. PATENT DOCUMENTS

| | | | |
|---|---|---|---|
| 1,479,841 A | * | 1/1924 | Stover |
| 3,425,427 A | * | 2/1969 | Andersen |
| 3,903,559 A | * | 9/1975 | Kuster et al. |
| 4,917,125 A | * | 4/1990 | Midkiff |
| 4,979,536 A | * | 12/1990 | Midkiff |
| 5,261,433 A | * | 11/1993 | Smith |
| 5,341,828 A | * | 8/1994 | Ferguson et al. |
| 5,454,391 A | * | 10/1995 | Cheung et al. |
| 5,730,164 A | * | 3/1998 | Midkiff et al. |
| 6,358,330 B1 | * | 3/2002 | McGraw |

FOREIGN PATENT DOCUMENTS

| | | | |
|---|---|---|---|
| GB | 1065486 | * | 4/1967 |
| GB | 1442258 | * | 7/1976 |
| JP | 52-44071 | * | 4/1977 |
| JP | 57-74252 | * | 5/1982 |
| JP | 57-172858 | * | 10/1982 |
| JP | 58-30853 | * | 2/1983 |
| JP | 64-56255 | * | 3/1989 |

OTHER PUBLICATIONS

European Patent Office 041,087 Dec. 1981 (EPO'087).*

* cited by examiner

*Primary Examiner*—Frankie L. Stinson
(74) *Attorney, Agent, or Firm*—Walter D. Ames, Esq.

(57) ABSTRACT

Apparatus for washing the wheels and tires of a vehicle includes an elongated tank into which vehicle to be washed enters and exits, and a plurality of impediments spaced along the bottom of the tank. The impediments are in the form of hollow angle irons with apertures formed in at least one of their side walls, and means is provided for spraying water through the apertures in the direction of the vehicle wheels and tires as the vehicle passes over the angle irons.

18 Claims, 3 Drawing Sheets

VEHICLE TIRE AND WHEEL WASHING APPARATUS

BACKGROUND OF THE INVENTION

1. Field of the Invention

The present invention relates generally to apparatus for washing vehicles. More specifically, it refers to such apparatus for washing heavy duty vehicles that have accumulated mud and grime on their wheels, tires and undercarriages.

2. Description of the Prior Art

The prior art is represented by apparatus having the same general purpose as disclosed in my prior U.S. Pat. No. 5,730,164, which was issued on May 24, 1998 and U.S. Pat. No. 4,917,125, which was issued on Apr. 17, 1990. Each of those patents discloses an elongated trough through which a vehicle passes when mud and dirt are to be removed from its wheels and tires. Expressed generally, the bottom of the trough is configured so that either of two structural modes is presented to the vehicle passing through the trough. In the washing mode, an open-mesh grating is put in place and the vehicle is positioned on the grating, where it is subjected to washing fluid so that these undesirable materials are removed from the wheels and pass through the grating to the bottom of the trough. Then, in the debris removal mode, the grating is pivoted out of its horizontal position and, in a separate series of steps, the accumulated debris is manually removed from the trough bottom.

While the purpose of the present invention is the efficient washing of vehicle tires and wheels, which is the same general objective of my prior patents, the structure of my new invention represents a substantial improvement over those prior structures.

To place the achievements of my invention in perspective, it will be apparent to anyone who has ever observed trucks and other heavy vehicles leaving a construction site that the vehicles often carry mud from the site on their wheels and tires, particularly after that site has been subjected to rain, snow, or other forms of moisture. Even if a hose is used to try to remove such accumulated dirt, the task is at best only partially accomplished, and the truck emerges from the work zone leaving a trail of dirt and debris that is offensive to the eye and potentially dangerous to passing joggers and motorists, who may slip or skid on the mud. As a consequence, this is a widespread problem, and one that may be most expensive for the contractor from whose property the truck is exiting as he attempts to comply with local ordinances forbidding littering the streets as well as to avoid the displeasure of neighboring residents.

It is, therefore, a primary object of the present invention to provide an apparatus whereby mud and debris may be efficiently removed from the wheels and tires of vehicles as they leave a construction or other work site and do not deface non-work zones.

It is a more specific object of this invention that the offending materials be removed in a continuous manner so that there is a continuing, simultaneous washing and debris removal procedure being effected. This continuous washing and debris removal makes it possible for a line of trucks to be washed without interruptions occasioned by the need for debris removal, as was the case with the prior art.

To contrast this object with the operation of my prior, patented apparatus, through use of the present invention there is no need to stop the washing, pivot the grates upwardly out of the path of the trucks, remove the debris, and then lower the grates into truck supporting position once again. Not only does that prior art procedure give rise to delays in washing a line of vehicles, but it will be apparent that problems can arise in attempting to support heavy duty vehicles on open-mesh grates, as the supports for such grates will have to sustain great weights. Further, the washing apparatus, itself, is subjected to moisture and debris so that the pivot mechanisms by which the grates are moved into and out of truck supporting position may well become clogged and inoperative. Those moving parts are subject to failure in the hostile environment of a construction site.

It is still another object of my invention to provide a mobile tire and wheel washing apparatus. This can be accomplished by forming the entire apparatus from metal, so that it may be moved from location to location after a construction site has been closed, for example. The prior art apparatus as embodied in my two patents have contemplated forming at least the trough, and usually the entire construct, from concrete. In any such structure when the construction site is no longer in use by vehicles, it is necessary to remove the concrete trough and entrance and exit ramps, an expensive and time-consuming task. Nevertheless, it will be apparent that a partially below-grade concrete structure cannot remain exposed as a danger to inquisitive passersby, and if after removal of the ramps the trough is attempted to be buried, that underground concrete barrier will remain as a hazard to further construction or other use of the property.

SUMMARY OF THE INVENTION

In its most rudimentary form the present invention comprises an elongated tank having opposed, transversely spaced side walls and a bottom. The tank is generally formed in three sections: a centrally located trough in which the primary washing function takes place, an entrance ramp leading from an elevated or ground level into the trough, and an exit ramp by means of which the vehicle leaves the trough after the primary washing function has been completed.

The trough is formed with a multitude of impediments spaced transversely across the trough bottom and extending upwardly from the bottom, so that the vehicle being washed contacts and rides on the impediments as it passes through the trough. When the tires of the vehicle contact successive impediments the vehicle is jarred and debris adhered to the vehicle, its tires and/or wheels is dislodged and falls from the vehicle. Further, at least some of the impediments contain means mounted on them for impelling the flow of washing fluid in the direction of the vehicle, its wheels and/or tires to further dislodge debris from the vehicle.

While the impediments can take different forms, one that has proved efficient are angle irons that are triangular in cross section and over which the vehicle passes as it moves through the trough. Such angle irons can be metal rods that have three sides, one of which is fixed to the bottom of the trough and the other two inclined toward each other to meet at an apex that extends upwardly from the trough bottom and is adapted to come into direct contact with the vehicle tires and, at least partially support the vehicle. The metal rods, which extend in rows across the trough bottom, may be spaced relatively closely together so that the vehicle tires contact the apices of those rods as it passes through the trough, and does not directly contact the trough bottom itself.

In a preferred embodiment of my invention at least one or preferably more of the spaced rows of impediments are hollow and have apertures formed in at least one of the two inclined sides of the impediments along their lengths. Means may be provided within the hollow impediments or rods or angle irons to impel washing fluid from the interior of the impediments through the apertures in the direction of the vehicle overhead. Generally, such fluid will be impelled in a direction normal to the plane of the inclined side of the impediment in which the aperture is formed. It has been found preferred that apertures be formed in both inclined sides of the impediments and that washing fluid be propelled from both of those inclined sides in directions normal to the planes thereof.

A permissive feature of the present invention is found in the structure of the entrance ramp, and in some cases, the exit ramp of the tank. In one preferred embodiment the entrance ramp, like the trough, has a series of rows of impediments mounted on its bottom and over which entering vehicles pass. Like the trough impediments, the ramp impediments are hollow and have means mounted therewithin to impel a flow of washing fluid through spaced apertures in the impediments in the direction of the vehicle. In this embodiment, however, at least some of the ramp impediments are circular in cross-section and are rotatable in order to force washing fluid against the entering vehicle from different directions.

Still another feature of a preferred embodiment of my invention relates to the manner in which mud and debris are removed from the bottom of the trough after, or in this case even during the washing of the vehicle. As stated hereinabove, it is an improvement of my invention that debris can be removed from the trough bottom without lifting a grating on which the vehicle rides in order to gain access to the bottom of the trough. In the present invention the vehicle rides directly in the trough or on impediments fixed to the bottom of the trough. In one embodiment an elongated drain is formed at the base of one of the side walls of the tank, which drain is adapted to received debris, mud and the like from the bottom of the trough. The other side wall of the trough has apertures spaced along its length above the juncture of that other side wall and the trough bottom. Means is mounted at those spaced apertures for impelling fluid from the apertures and across the bottom of the tank, thereby washing debris that has been dislodged from the vehicles into the trough in the elongated drain formed in the first side wall of the trough.

As yet another feature of my invention, it has been found advantageous to maintain a level of liquid in the bottom of the trough so that mud and debris do not become adhered to the bottom of the trough and thereby made more difficult to remove. Thus, it is a preferred aspect of my invention that a level of about 2 to 6 inches of liquid be maintained in the bottom of the trough, with about 5 inches having been determined to be the most preferable. Indeed, it is a feature of my invention that a liquid level in the trough be so high that the fluid being impelled from the impediment apertures pass through the liquid and then through the air toward the vehicle overhead.

As still another aspect of my invention, in certain uses it has also been found desirable to wash the vehicle tires, wheels and/or underbody while it is positioned on the entrance ramp. Thus, that ramp may have impediments spaced across the ramp in the manner of the transversely spaced impediments on the trough bottom, and means is provided within the ramp impediments for directing a flow of washing fluid in the direction of the entering vehicle. With respect to those ramp impediments, however, it has been determined that it is preferable that they be circular, rather than triangular in cross-section and that they be rotatable so that the washing fluid may be directed toward the vehicle at different angles according to the specific vehicle that is being washed. Further, such rotatable, apertured, spray-issuing impediments may be utilized on the exit ramp if desired.

Yet another feature of my invention is that an elongated tank, the improvements to which form a part of my invention, can be utilized as part of a continuous washing system in which means are provided for directing washing fluid and debris from the side wall drain in the trough to apparatus for separating the washing fluid and debris The washing fluid is then redirected to the trough where it is once again used to flush debris into the side wall drain, and even through the apertured impediments, thus rendering the system continuous. Moreover, the system may be formed from metal, so that it is transportable from one construction site to another.

These and other objects, features and advantages of the present invention will become more readily apparent from the following detailed description of a preferred embodiment of my invention, which description is written in conjunction with annexed drawings in which:

BRIEF DESCRIPTION OF DRAWINGS

FIG. 5 is a fragmentary section, greatly enlarged, taken in the direction of the arrows 5—5 of FIG. 1.

DETAILED DESCRIPTION OF PREFERRED EMBODIMENT

Figure 1:
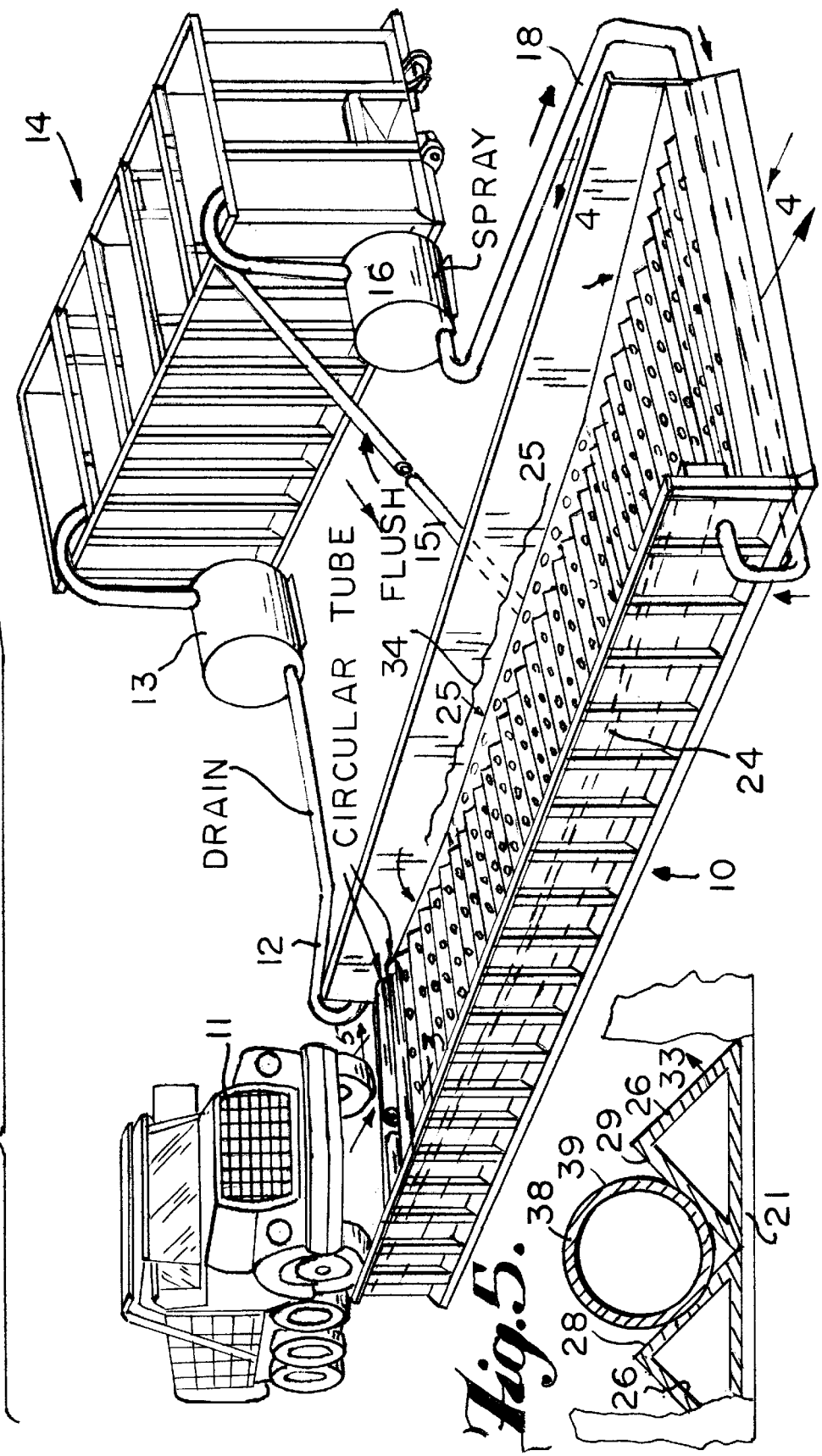
FIG. 1 is a perspective view illustrating the general layout of my vehicle tire and track washing apparatus.

Referring now to the drawings, and in particular to FIG. 1 thereof, the general layout of a preferred system for washing vehicle tires and wheels and recirculating the washing fluid is illustrated. In a broad form, the system comprises an elongated tank, indicated by reference arrow 10, into which a truck 11 enters. After the truck 11 has been subjected to cleaning in the tank 10, wash water that has been utilized in that process, together with debris carried along with the water, is directed through a drainage pipe 12 and elevated by pump 13 into a separator 14, where the wash water and the debris carried thereby are separated. Water from the separator is then redirected to the washing tank 10 by means of a flush pipe 15, and other water that is separated from the debris is also redirected to the tank 10 by pump 16 through recirculation pipe 18. In this manner the washing process employed by the apparatus of my invention is able to be operated in a continuous manner.

The structure of the tank 10 is, in itself, a part of my invention. As seen in FIG. 1 and particularly in FIG. 2, the washing tank 10 is comprised of three parts: a trough 20 in which the primary washing takes place, an entrance ramp 21 through which the vehicle 11 enters the tank, and an exit ramp 22 by means of which the truck leaves the tank. While it is preferred that the three sections be delineated from each other, they can be provided as an integral apparatus if desired.

Figure 3:
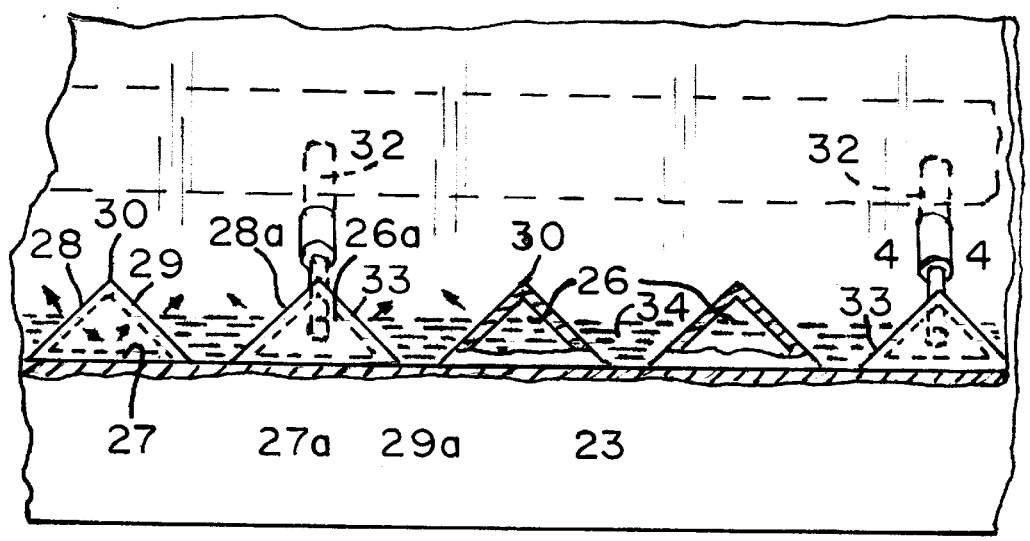
FIG. 3 is a longitudinal, sectional view, greatly enlarged, taken in the direction of the arrows 3—3 of FIG. 1.

The structure of the trough 20 is of particular importance to one aspect of the present invention. Trough 20 is elongated and has a bottom wall 23, and opposed side walls, designated as first side wall 24 and second side wall 25. Lying within the trough 20 and fixed to the bottom 23 of the trough are a series of what are broadly termed impediments 26. These impediments, the structure of which is best seen in FIG. 3, are in the form of angle irons having three sides. In this preferred embodiment the sides of the impediments 26 are shown to be of equal dimensions so that they form an equilateral triangle in cross-section. As so viewed, each angle iron or impediment 26 has a base wall 27 fixed, as by welding, to the bottom 23 of trough 20. The other two walls 28 and 29 of the angle iron extend upwardly and inwardly from the ends of the base wall 27. Those walls 28 and 29 are inclined toward each other and meet to form an apex 30.

Figure 2:
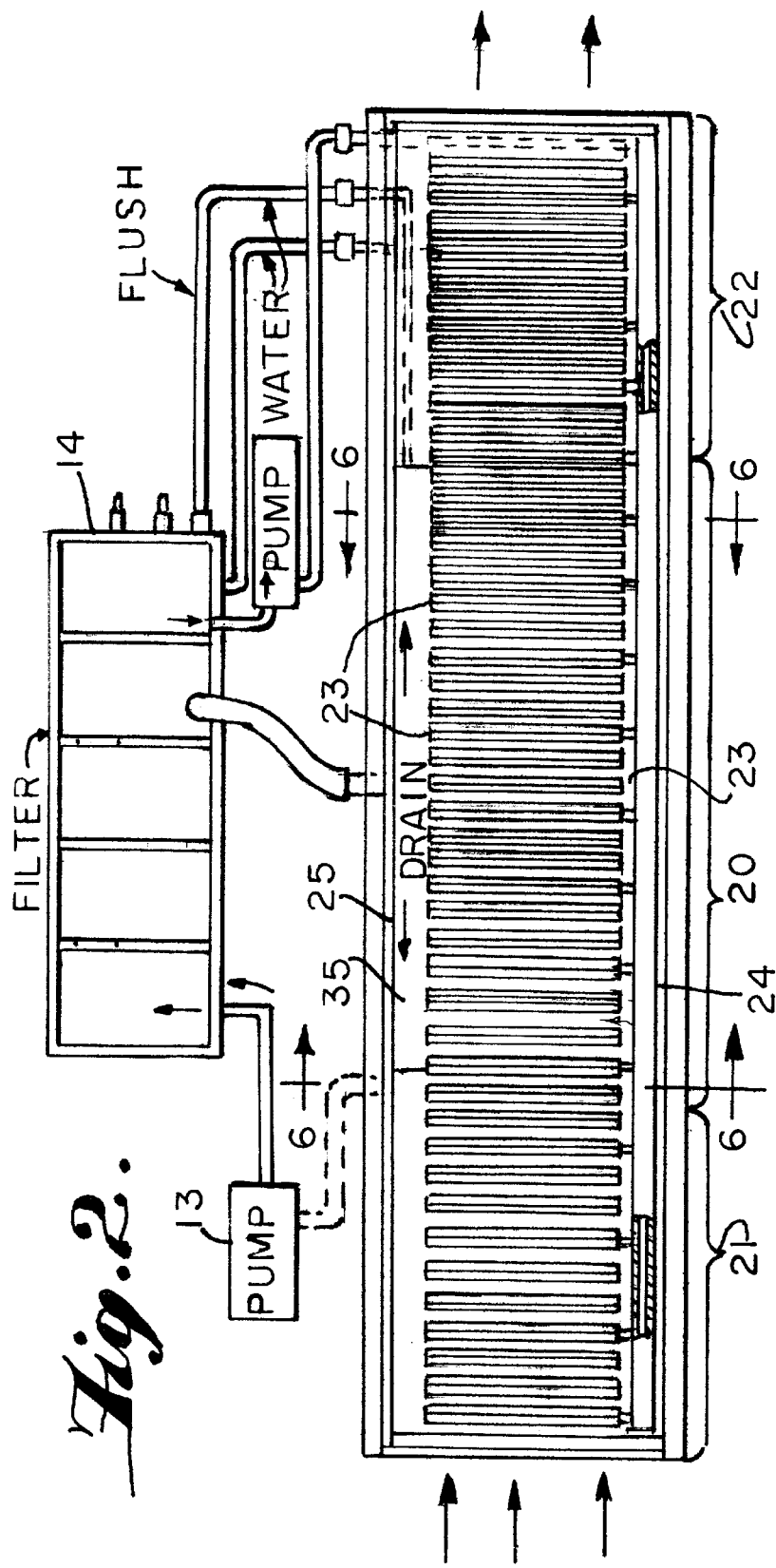
FIG. 2 is a top plan view of the embodiment of FIG. 1.

It will thus be seen that, as in the top plan view of FIG. 2, the trough 20 of the tank 10 presents a series of spaced impediments across the bottom 23 of the trough, and the apices 30 of the angle irons will be contacted by the tires of a vehicle 11 that has been positioned in the trough. Indeed, it is presently preferred that the angle irons be spaced from each other along the bottom of the trough so that a vehicle in the trough will move through the trough without contacting the bottom of the trough, instead moving from apex to apex of adjacent angle irons and straddling the spaces by means of which the angle irons are separated from each other.

Figure 4:
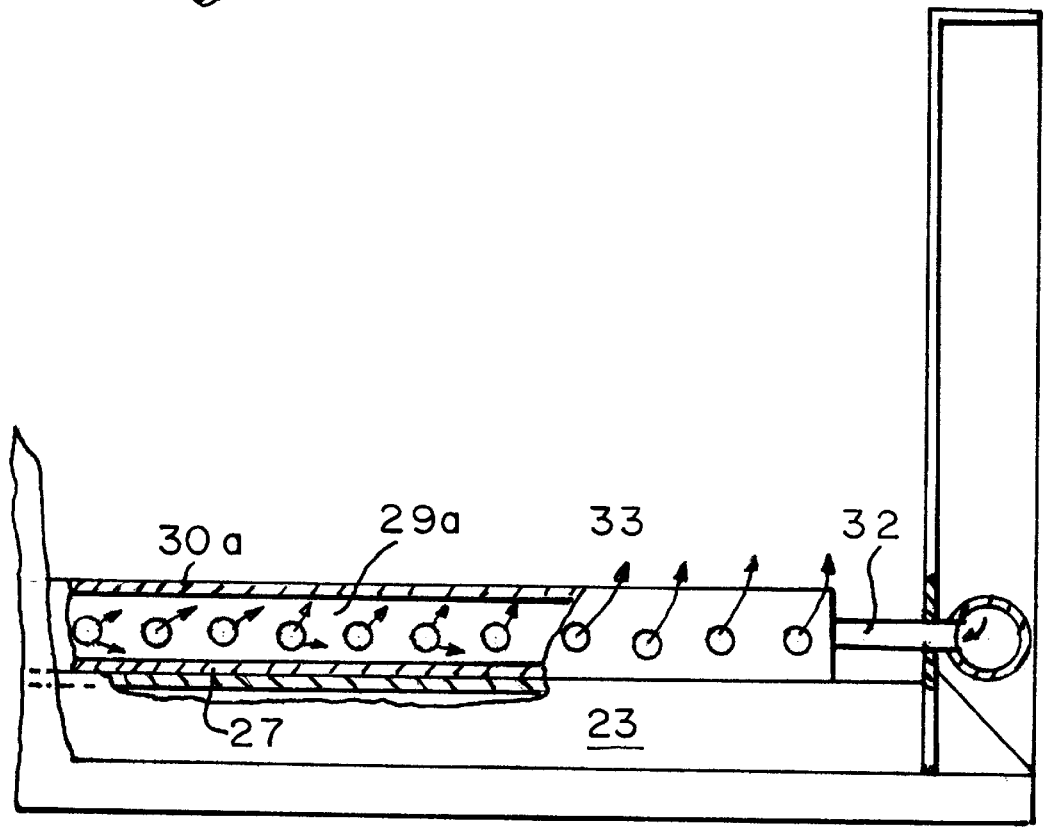
FIG. 4 is a section, greatly enlarged, taken in the direction of the arrows 4—4 of FIG. 3.

While not every angle iron affixed to the bottom of the trough 20 need employ a spraying function, at least some of those angle irons 26a will function in that manner. As seen in FIG. 3, every third angle iron 26a employs a spraying feature. Impediment 26a is hollow, so that fluid, such as a washing liquid, can occupy the central orifice of the impediment, bounded by the three sides 27a, 28a and 29a of that angle iron and fed by means such as an associated pipe 32, shown in phantom lines. As illustrated, pipe 32 does not extend within the angle irons 26. In my preferred embodiment, inclined sides 28a and 29a of spraying angle iron 26a are formed with spaced apertures 33, which extend in a desired pattern across the faces of those sides of the angle iron. Such spacing is best seen in FIG. 4. In operation, means such as a pump forces water or other fluid through the central orifices in the spraying angle irons 26a, and from there the fluid is directed through the apertures 33 in the side walls 28a and 29a of those angle irons in the direction of the vehicle overhead. With sufficient pressure the wash water will be forced through the apertures 33 in a direction substantially normal to the plane of the inclined side walls 28a and 29a of the angle irons 26a that incorporate a spraying function.

It will be apparent that water sprayed from the angle irons against the wheels and tires of a truck in the trough will accumulate in the bottom 23 of trough 20. Indeed, in FIGS. 1 and 3 water is illustrated at a level 34 at the bottom of the trough. Maintenance of such a level, in actual practice about 2 to 6 inches, most preferably about 5 inches, has been found to be advantageous in the removal of debris from the vehicle overhead, as the debris is easier to move across the tank when it can be partially floated away. In this instance the wash fluid from the apertures 33 in the spraying side walls of the angle irons will, with sufficient pressure, force spraying liquid through the level 34 of liquid in the trough bottom and against the vehicle tires and wheels.

Figure 6:
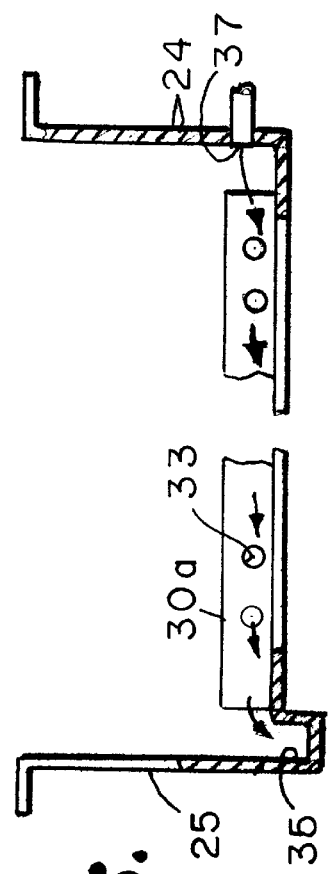
FIG. 6 is a transverse section, greatly enlarged, taken in the direction of the arrows 6—6 of FIG. 2.

It will also be apparent that the water accumulated in the bottom of the trough 20 must be removed before it accumulates to such a degree that the spraying function of the spray angle irons 26a is entirely blocked. For this purpose, as seen in FIG. 6, an elongated drain is formed at the base of second side wall 25. That drain, indicated generally by reference numeral 35, serves to catch wash water and debris that is directed into it. The drain 35, which is a depression at the base of the second side wall, extends at least a major potion of the length of the trough 20 and preferably the entirety of such length. The drain slopes from one end of the trough to the other, so that wash fluid and debris directed into it move and are flushed toward the lower end of the trough. In the illustration of FIG. 1, the drain 35 slopes toward the entrance ramp end of the tank. Protecting holes 36 may be provided at any upper level of the drain 35 so that rocks and debris of a substantial size will be prevented from entering the drain and subjecting the pump 13 to damage.

While some wash water and accumulated debris will flow from the bottom of the trough 20 into the drain 35 without added assistance, it has been found desirable to ensure such passage of water and debris by providing jets of water in a direction transversely of the trough. Thus, as illustrated in FIG. 6, the first side wall 24 of the trough is provided with apertures spaced along the base of that side wall in opposition to the drain 35 at the base of the second side wall 25 of the trough. Those wall apertures 37 are generally aligned with the spaces between the impediments 26 and fluid, usually water, issuing under pressure from those apertures 37 is forced across the width of the trough, thereby carrying with it spent wash water and debris accumulated from the tires and wheels of the overhead vehicle.

Another feature of my invention concerns the optional structure of the entrance ramp 21, which structure may also be applied to exit ramp 22. From fragmentary view FIG. 5, it will be seen that in what is a series of impediments 26 that line the bottom 23 of the trough 20 of my structure, on the entrance ramp that structure has been augmented by a plurality of substantially cylindrical pipes 38, which extend between the angle irons 26 and rest against the inclined side walls 28 and 29 of those impediments 26. Pipes 38 are hollow and contain spaced apertures 39 through which washing fluid is sprayed against overlying vehicles. Spraying through pipes 38 may be effected as an alternative to or in addition to spraying through the angle irons 26, and may also be used in the bottom of the trough 20 of the tank 10.

In presently preferred operation of the apparatus of this invention, a vehicle 11 is to be washed to remove mud and debris from its wheels, tires and undercarriage prior to its leaving a construction site and using the roads of a residential neighborhood. The vehicle enters tank 10, which preferably is formed from steel and is portable, using the entrance ramp 21. That ramp is of the structure shown in FIG. 6, and some debris is initially removed from the truck tires by the spray from apertures 39 of pipes 38, as well as spray from apertures 33 in angle iron side walls 28a and 29aq.

The truck 11 then enters the trough 20 which is the centrally located portion of the tank 10, and is substantially flat. The truck tires ride on the apices 30 and are jarred as they move from apex to apex, thereby loosening and dislodging debris. As the truck moves through the trough 20 wash water is sprayed against its undercarriage, wheels and tires through the apertures 33 in side walls 28a and 29a of angle irons 26a, and every third angle iron 26a in the trough has spray apertures 33 located in both sides 28a and 29a thereof As the truck is being jarred and washed, water 34 accumulates in the bottom of the trough to a depth of about 5 inches, and debris floats on and in that water. The water and the debris it carries are forced from the first side wall 24 of the tank across the tank toward the second side wall 25 by fluid under pressure from apertures 37 at the base of the first side wall 24 and into drain 35 in second side wall 25, where larger rocks are prevented from entering the drain by a weir 22. Wash water and debris continuously entering the drain 35 are removed from a downward end thereof by extraction pump 13 to a separator where the debris is separated from the wash water and disposed of. The wash water separated from the debris in the separator is recycled. Some of that water, usually from an overflow exit, is used to flush the drain 35 from its upper end toward the lower end thereof, while another part of the separated wash liquid is recycled to apertures in the first side wall 24 to force debris across the tank and into the drain 35 in second side wall 25. Still another portion of the separated wash liquid is recycled under pressure to the angle irons 26a at the bottom of the trough, to be forced through apertures 33 in side walls 28a and 29a against the overlying vehicle.

The process that is effected by operation of the apparatus described herein is continuous, and makes use of all the water that enters the system, although some supplemental supply of water will often be necessary. Optimum operation of the apparatus is highly friendly to the environment: a vehicle enters the tank and emerges clean from the exit ramp, while accumulated debris and mud are periodically removed from the separator discharge and most of the water with which the system is charged is recycled for on site use. Further, the apparatus is preferably made of steel, so that when the construction or other site is no longer operational, the tank and associated apparatus can be disassembled and moved to another location.

It will be apparent to those of skill in this art that many alterations and modifications may be made in the preferred embodiment described in detail hereinbefore without departing from the spirit of the invention. As to all such alterations and modifications, it is desired that they be included within the purview of my invention, which is to be limited only by the scope, including equivalents, of the following, appended claims.

I claim:

1. Apparatus for removing debris from and washing a vehicle and its tires or wheels, comprising:
    an elongated tank having opposed, spaced side walls and a bottom, and terminating at one end in an inclined vehicle entrance ramp and at the other end in an inclined vehicle exit ramp, said ramps being joined to a centrally located trough whereby a vehicle carrying debris on its exterior passes through said trough and enters and exits said tank through said ramps;
    a multiplicity of impediments spaced transversely across and fixed to said trough bottom and extending upwardly away from said bottom in the path of said vehicle, so that as said vehicle passes through said trough, the contact of said tires of said vehicle with said impediments loosens debris adhered to said vehicle and its tires and wheels, and
    means mounted along at least some of said impediments impelling a flow of washing fluid in the direction of said vehicle and further dislodging debris from said vehicle and its tires.

2. Apparatus as claimed in claim 1, in which said impediments include metal angle irons fixed to said trough bottom along one side thereof, said angle irons having inclined sides that meet to form an apex that extends upwardly away from said bottom and over which said vehicle passes as it moves through said trough.

3. Apparatus as claimed in claim 1, in which said impediments are metal rods that are triangular in cross-section, one side of each of said impediments being in contact with and fixed to said trough bottom and the other two sides being inclined toward each other and meeting at an apex that extends upwardly away from said bottom and over which said vehicle passes as it moves through said trough.

4. Apparatus as claimed in claim 3, in which at least some of said impediments are hollow and have spaced apertures formed along the length of at least one of said inclined sides.

5. Apparatus as claimed in claim 4, further including means within said hollow impediments for impelling fluid through said spaced apertures in the direction of said vehicle.

6. Apparatus as claimed in claim 5, said fluid being a washing liquid and being impelled from said impediment inclined side in a direction substantially normal to the plane of said side.

7. Apparatus as claimed in claim 4, in which said apertures are formed in both of said two inclined sides of said impediments, and washing liquid is impelled through said apertures in a direction substantially normal to the planes of said two inclined sides.

8. Apparatus as claimed in claim 1, in which said impediments are spaced relatively closely together along the length of said trough so that a vehicle tire contacts said impediments but not the bottom of said trough.

9. Apparatus as claimed in claim 1, said vehicle entrance ramp having a bottom and ramp impediments spaced transversely from each other along the length of said ramp, said ramp impediments having apertures spaced along their lengths and including means therewithin for impelling a flow of washing fluid in from said apertures in the direction of a vehicle on said ramp.

10. Apparatus as claimed in claim 9, in which said entrance ramp impediments are substantially circular in cross-section.

11. Apparatus as claimed in claim 10, in which said entrance ramp impediments are rotatable to direct the flow of washing fluid at different angles toward said vehicle.

12. Apparatus for removing debris from and washing tires and wheels of a vehicle, comprising:
    an elongated tank having opposed, transversely spaced side walls and a bottom, and terminating at one end in an inclined vehicle entrance ramp and at the other end in an inclined vehicle exit ramp, said ramps being joined to a centrally located trough whereby a vehicle carrying debris on its exterior passes through said trough and enters and exits said trough by said ramps;
    a multiplicity of impediments spaced from each other along the length of said trough and fixed to said trough bottom, said impediments extending away from said bottom across at least a portion of said bottom in the path of said vehicle, so that as said vehicle passes through said trough, the contact of the tires of said vehicle with said impediments loosens debris adhered to said vehicle and its tires, said impediments having apertures spaced along a surface thereof, and
    an elongated drain formed at the base of one of said tank side walls, said drain being adapted to receive washing fluid and debris washed from said vehicle.

13. Apparatus as claimed in claim 12, in which at least some of said impediments are hollow and have inclined sides extending upwardly from said trough bottom and meeting at an apex of said impediment.

14. Apparatus as claimed in claim 13, in which at least one of said inclined sides of said impediments has spaced apertures formed along its length, said impediments being hollow, and means impelling washing fluid through said hollow impediments and from said apertures in the direction of a vehicle in said trough.

15. Apparatus as claimed in claim 12, in which the other of said trough side walls has apertures spaced along its length at or above the juncture of said other side wall and said trough bottom, and means for impelling fluid from said side wall apertures, across the bottom of said trough, and washing debris therefrom into said drain.

16. Apparatus as claimed in claim 15, in which a level of washing fluid is maintained in said trough bottom to aid in the removal of debris therefrom.

17. A system for continuously removing debris from wheels and tires of vehicles and washing said wheels and tires, comprising an elongated tank having opposed, transversely spaced side walls and a bottom, and terminating at one end in an inclined vehicle entrance ramp and at the other end in an inclined vehicle exit ramp, said ramps being joined to a central local trough having side walls and a bottom, whereby a vehicle carrying debris on its exterior passes through said trough and enters and exits said trough by said ramps, comprising:

an elongated drain formed at the base of one of said trough side walls, said drain being adapted to receive debris washed from said vehicle;

means mounted in said other trough side wall for directing a stream of washing fluid across said bottom toward and into said side wall drain together with debris located at said bottom;

means directing said debris and washing fluid from said drain to means separate from said tank for separating said debris and said washing fluid from each other, and means for carrying said separated washing fluid to said means mounted in said other trough side wall to once again be directed across said trough bottom and into said trough side wall drain.

18. A continuous system as claimed in claim 17, in which said tank and said means for separating said debris and said washing fluid are formed from metal, so that said system in readily transportable from one site to another.

* * * * *